INVENTOR
R. L. CARBREY
BY Harry C. Hart
ATTORNEY

Sept. 17, 1957 R. L. CARBREY 2,806,997

CIRCULATING PULSE CODERS

Filed March 28, 1956 3 Sheets-Sheet 2

INVENTOR
R. L. CARBREY
BY Harry C. Hart
ATTORNEY

INVENTOR
R. L. CARBREY
BY Harry C. Hart
ATTORNEY 2,806,997

CIRCULATING PULSE CODERS

Robert L. Carbrey, Madison, N. J., assignor to Bell Telephone Laboratories, Incorporated, New York, N. Y., a corporation of New York Application March 28, 1956, Serial No. 574,562

10 Claims. (Cl. 332—11)

This invention relates to transmitter apparatus for communication systems and particularly to coders for use in the transmitting equipment of communication systems employing pulse code modulation as the transmission technique.

In communication systems utilizing pulse code modulation, a speech wave or other signal to be transmitted is sampled periodically to ascertain its instantaneous amplitude. The measured instantaneous amplitude is expressed by pulse codes analogous to telegraph codes.

One code which conveniently may be employed in pulse code modulation involves permutations of a fixed number of code elements, each of which may have any one of several conditions or values. An advantageous code of this sort is the so-called binary code in which each of the fixed number of code elements may have either of two values. One way of representing these values is to represent one of them by a pulse, sometimes referred to as an "on" pulse and the other by the absence of a pulse, sometimes referred to as an "off" pulse. Alternatively, one value may be represented by a positive pulse and the other by a negative pulse. The total number of permutations obtainable with the binary code is proportional to $2^n$ where $n$ is the number of code elements of a code pulse group or character.

Because the total number of different signal amplitudes which may be represented by such a code of a fixed number of elements is limited, it is customary to divide the continuous range of amplitude values of which the transmitted signal is capable into a fixed number of constituent ranges which together encompass the total range. Each of these smaller or constituent amplitude ranges may then be treated as if it were a single amplitude instead of a range and is represented by an individual one of the permutations of the code. In the use of this method of code transmission the instantaneous amplitude ascertained by a sampling operation is represented by the respective permutation indicative of the amplitude range, or step, which most nearly approximates the amplitude of the measured sample. If, for example, the sample amplitude is nearest to that amplitude represented by the ninth step of the signal amplitude range the permutation code corresponding to range 9 is transmitted.

It is a fundamental characteristic of any such system that each code element in one of its values represents the presence in the sampled amplitude of a particular fixed portion of the total amplitude range, while in the other value it represents the absence of that same portion.

Of the many systems which have heretofore been proposed for encoding signal wave samples into trains of binary code pulse groups one which is of especial interest in the present connection utilizes a feedback network having a gain factor of 2 and a round trip delay equal to the interval between successive code element pulses of the outgoing code pulse groups and, coupled to this network, a threshold device such as an amplitude discriminator or slicer adjusted to respond by the delivery of an output pulse of standard amplitude upon application to it of a signal which is equal to or greater than one-half of the full maximum amplitude range of the signal to be coded. In operation, signal samples to be coded are applied in regular succession to this feedback network. Each sample circulates around the loop, being doubled in magnitude and delayed by a single pulse interval on each round trip. When as a result of this process it has reached an amplitude equal to or greater than one-half the full signal amplitude range the slicer operates to (*a*) deliver an output pulse, and (*b*) subtract one-half the full amplitude range from the signal circulating in the loop. This subtraction operation leaves a residue which continues to circulate around the loop, being doubled in magnitude and delayed by a single pulse interval on each round trip as before. Depending on the magnitude of the original sample, this residue after circulatory multiplication may or may not reach the operation threshold of the slicer. If it does, another output pulse is delivered and another subtraction, identical with the first subtraction, is made. This process is continued for a number of full round trips equal to the number of code elements in the desired code pulse group. Thereupon the feedback loop is disabled to prevent uncontrolled oscillation and to prepare it for coding the following sample.

The operation of this apparatus is excellent, provided the repetition rate of the pulses of the code group is sufficiently high. At lower repetition rates, however, the length or complexity of the delay device which introduces the required delay of a whole interpulse interval may become excessive. Furthermore, a group of pulses which all have the same polarity contains a substantial low frequency component, and at low repetition rates unavoidable small leakage paths in the apparatus produce a decay of this low frequency component which manifests itself as a "wandering zero" and hence introduces a lack of precision in the coding operation. Accordingly, it is a principal object of the present invention to avoid these difficulties and carry out the coding operation without the introduction of any substantial low frequency component into any pulse group, and hence to reduce the stringency of the requirements on the apparatus for transmission of components of zero or very low frequencies.

This object is attained, in accordance with the invention, by arranging that each incoming signal sample shall make an even number of trips, e. g., two, around the feedback loop for each corresponding round trip of the simple embodiment described above. This is done, for the case of two round trips, by proportioning the feedback network to introduce, for each round trip, a delay of one-half interpulse interval and a gain of $\sqrt{2}$. After each single round trip the sample is increased in magnitude by $\sqrt{2}$ and delayed by one-half interpulse interval. After two such round trips it is evidently increased by a factor 2 and delayed by a full interpulse interval. For a code pulse group of a given number $n$ of code elements, the signal sample, either without modification or after one or more subtractions of one-half the full amplitude range, makes a total of $2n$ round trips around the loop. The slicer responds as before when the sample has reached one-half the full amplitude range and, as before, carries out the subtraction operation and delivers an output pulse for each such response.

The employment of this even number relation permits the use of a phase-inverting network such that after the first round trip or any odd number of round trips, the output pulse is inverted in polarity and has a magnitude which is not related to the input pulse magnitude by a power of 2 but differs from such relation by $\sqrt{2}$. Each of these inverted polarity pulses occurs in the center of an interpulse interval. They do not contribute to the sampled output and are ignored. Within the feedback network itself, however, these negative pulses tend to balance the train of positive pulses so that the zero or low frequency component of the entire pulse train, taken as a whole, is greatly reduced.

These numerical relationships may evidently be generalized to include all cases in which the pulse makes, during each full interpulse interval, an even number of round trips in the course of all of which together it is increased or reduced in amplitude by a factor 2 and delayed by a single interpulse interval. Thus, if four round trips are considered desirable, the network is proportioned to provide a gain factor of $$(2)^{\frac{1}{4}}$$

and a delay of one-quarter pulse interval for each round trip; and, in general, for any even number $2r$ of round trips, the network is proportioned to provide a gain factor of $$(2)^{\frac{1}{2r}}$$

and to introduce a delay of $T/2r$, where T is the interpulse interval and $r$ is any integer.

The invention will be fully apprehended from the following detailed description of illustrative embodiments thereof, taken in connection with the appended drawings in which.

The detailed discussion of the apparatus of the invention will advantageously be postponed until a ground work has been laid for it in the form of a description of apparatus embodying known principles, and its shortcomings.

Figure 1:
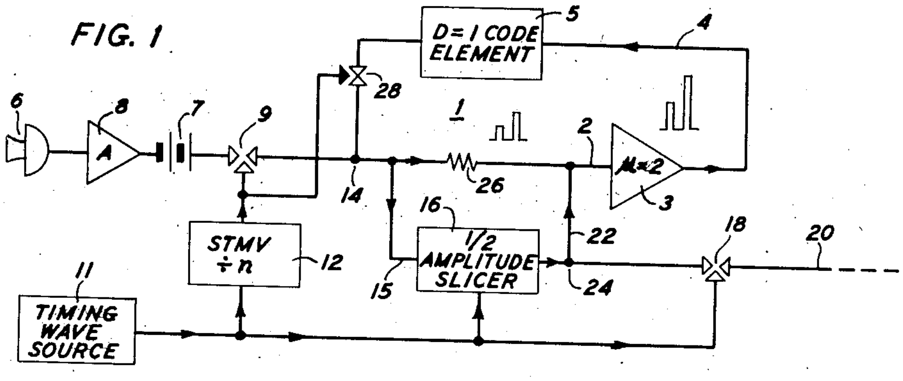
Fig. 1 is a block schematic diagram showing apparatus embodying principles of the prior art.

Referring now to the drawings, Fig. 1 illustrates coding apparatus which is in some respects similar in its operation to the beam tube coder of F. Gray Patent 2,617,980. The heart of the system is a feedback network 1 comprising a forward path 2 containing a linear amplifier 3 and a feedback path 4 containing a delay device 5. These elements are proportioned to furnish, for the feedback network as a whole, a feedback factor or $\mu\beta$ characteristic having a magnitude of 2 and a delay around the feedback loop of a single interpulse interval. A signal originating, for example, in a microphone 6 and converted to a signal of unvarying polarity, as by addition of the potential of a battery 7, is raised to a suitable level by an amplifier 8 to appear at the left-hand conduction terminal of a sampling switch or gate 9. A timing wave source 11 operating at the code pulse rate, controls a frequency divider such as a single trip multivibrator 12 which delivers pulses at the pulse group rate or signal sampling rate to actuate the control terminal of this switch 9, briefly to establish a conduction path from its left-hand terminal to its right-hand terminal once for each "sampling interval," thus to apply to the input terminal 14 of the feedback network 1 a succession of brief pulses each of which constitutes a single signal sample.

The input terminal 14 of the feedback network 1 is also connected to the input terminal 15 of a slicer 16 which is proportioned to respond in the same way to all signals in excess of one-half the full signal amplitude range and not to respond at all to samples of less than this magnitude. It may be of any desired construction, for example a single trip multivibrator of well-known variety. Alternative constructions for the slicer will be discussed below.

Each time it responds, the slicer 16 performs two operations: First, by way of a gating switch 18 operated by the pulses of the timing wave source 11 and hence synchronized with the code pulse rate, it delivers an output pulse of standard magnitude to an outgoing line 20 by way of an output connection 22. Second, it delivers to the input terminal of the amplifier 3 a pulse of magnitude equal to one-half the full signal amplitude range, and of polarity opposite to that of the signal sample. For the sake of simplicity it is shown as delivering the same pulse from its output terminal 24 both to the outgoing line 2 and to the input terminal of the amplifier 3. Correct proportioning of the magnitude of the pulse delivered to the amplifier 3 forms a part of the invention, while the only requirement placed on the magnitudes of the pulses delivered to the outgoing line 20 is that they shall be alike.

An attenuator, pad or buffer, here shown simply as a resistor 26, may be inserted between the input terminal 14 of the network 1 and the input terminal of the amplifier 3; i. e., in shunt with the slicer 16, merely to prevent feedback of the slicer output signal to its input point. The slicer itself may readily be constructed to be unidirectional; i. e., to be insensitive to signals applied to its output terminal 24.

The manner in which the apparatus of Fig. 1 carries out the operation of coding the incoming signal sample is as follows:

Let it be assumed that the full amplitude range of the incoming signal has the magnitude 32 units and that this range is divided into 32 distinct constituent subranges, each differing from the one below it by one unit. To express any of the 32 possible signal sample amplitudes in the binary code requires characters of 5 code elements, or code pulse groups of 5 pulses. Let it be assumed, further, that a signal sample to be coded is barely in excess of one unit: i. e., its magnitude is 1.01 on the scale 0–32. This signal sample is applied to the input terminal 14 of the network 1. It is evidently of much too small an amplitude to operate the slicer 16. It passes through the attenuator 26, the amplifier 3 and over the feedback path 4 through the delay device 5 to return to the input point 14 after one pulse interval, increased in magnitude by a factor 2; i. e., with an amplitude 2.02 units. This is still too small to operate the slicer 16. It makes a second trip around the loop to reappear with an amplitude 4.04, and a third round trip to reappear with an amplitude 8.08. It is still too small to operate the slicer and hence makes a fourth round trip, to reappear at the input point 14 of the network with an amplitude 16.16. This is of magnitude sufficient to operate the slicer 16. Hence, an output pulse is delivered to the outgoing conductor 20 and a negative pulse of amplitude 16 units is applied to the input terminal of the amplifier 3. This negative pulse is added to the positive pulse of 16.16 units to leave a residue of 0.16 unit as the net signal applied to the amplifier 3. This signal could evidently circulate many times around the loop before being magnified to such a point as to reach the slicer threshold of 16 units. However, by this time five pulse intervals have elapsed and, to prevent uncontrolled regeneration which might cause interference with the coding of the following signal sample, the feedback loop 1 is now briefly disabled by application of a pulse from the single trip multivibrator 12 to the control terminal of an auxiliary switch 28, normally closed. While this switch could in principle be located at any point of the feedback loop, it is advantageously located as shown between the output point of the delay device 5 and the input point of the amplifier 3. This insures completion of the coding operation for the first signal sample before the feedback network is disabled.

To recapitulate the sequence of events described above, there were present, at the input terminal 15 of the slicer 16 and at successive pulse intervals starting with the signal sample, pulse amplitudes of magnitudes 1.01, 2.02, 4.04, 8.08, and 16.16. These were interpreted by the slicer 16 as having amplitudes 0, 0, 0, 0, 1. Hence the signal applied to the outgoing line 20 is of the form 00001 which is the correct binary code representation of the original signal sample whose amplitude was 1.01.

If, instead of the amplitude 1.01 units the original signal sample had had an amplitude of 1.99 units then, after one trip around the feedback loop it would have reappeared with an amplitude 3.98 units; after two trips with an amplitude 7.96 units; after three such trips with an amplitude 15.92 units and after four such trips with an amplitude 31.84 units. The slicer 16 would fail to respond after the first, second and third round trips but would readily respond after the fourth. Hence, it would interpret the input signal sample exactly as before, and generate an outgoing code pulse group of the form 00001. Thus, for any amplitude sample lying in the range between one unit and two units, even though it may be very close to the margin of this constituent subrange, the apparatus of Fig. 1 interprets all of them alike and correctly as having a quantized amplitude of unity.

Figures 2, 4:
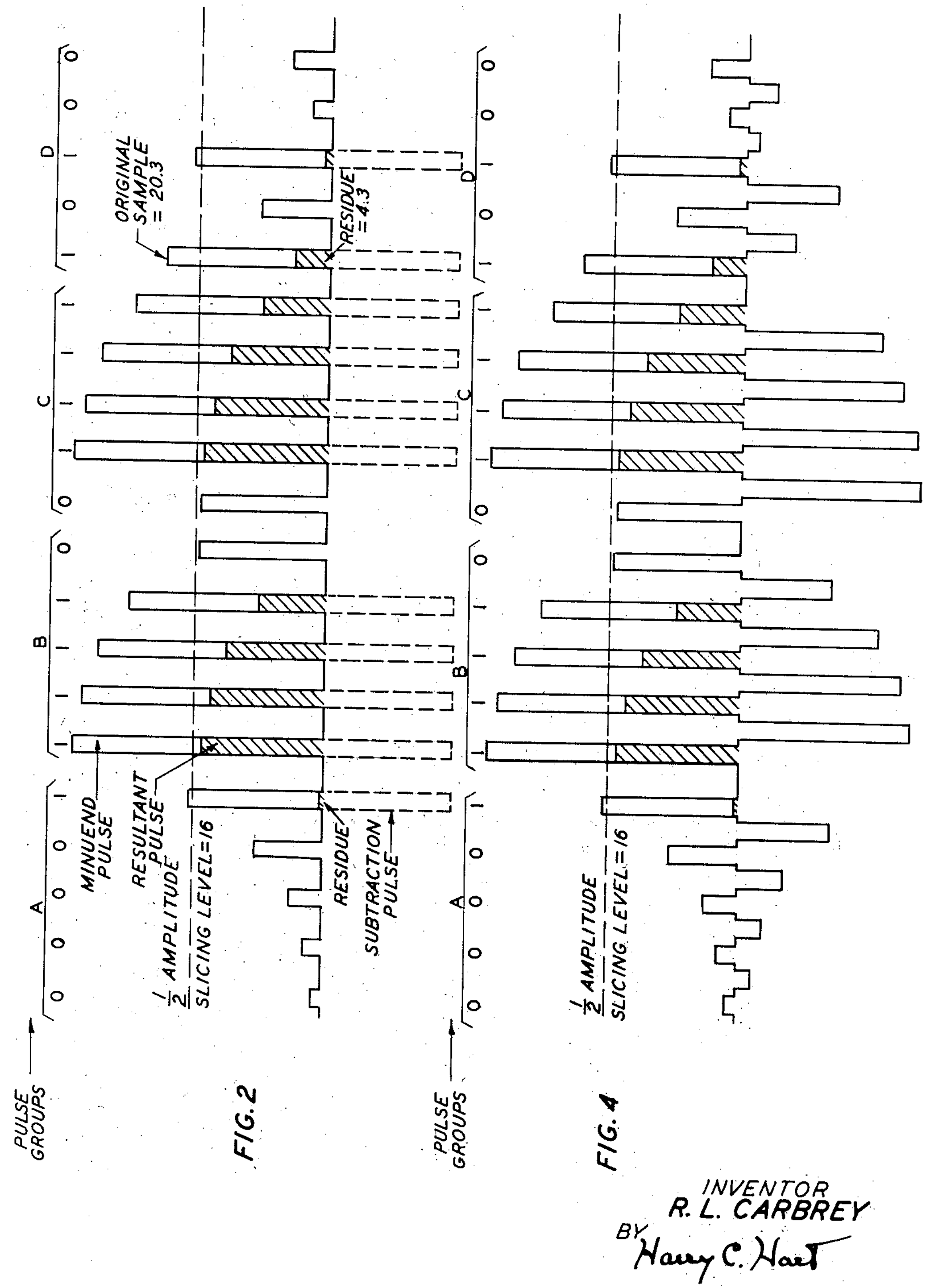
Fig. 2 is a group of waveform diagrams illustrating the mode of operation of the apparatus of Fig. 1.
Fig. 4 is a group of waveform diagrams illustrating the mode of operation of the apparatus of Fig. 3.

Fig. 2 illustrates, at the left, the successive events which take place in the example first discussed above, the original signal sample being magnified by a factor 2 for each round trip, to reach the amplitude 16.16 only as the last round trip is about to commence. In this figure the pulse shown by negative broken lines is the subtraction pulse output of the slicer 16 and the low level crosshatched portion is the residue of 0.16 after the subtraction operation. The slicing level, one-half the full amplitude range is shown by a horizontal broken line and the interpretation by the slicer of the pulse sequence as to whether a pulse lies below this threshold of above it is shown above the pulses. The second, third and fourth parts of Fig. 2 show similar waveform diagrams illustrating the operation of the coder of Fig. 1 for three other signal samples, of an amplitude between 30 and 31 units, between 15 and 16 units, and between 20 and 21 units, respectively. As shown above the resulting pulse groups, the slicer 16 interprets them as 30, 15 and 20 and encodes them accordingly.

The sequences of pulses in Fig. 2 are all of the same polarity. They represent the conditions which obtain within the feedback loop 1 during the course of the coding operation. Any such sequence evidently contains a "direct-current" component of zero or low frequency which is of substantial amplitude. In principle, unavoidable leakage paths and other departures of the feedback loop from ideal perfection tend to introduce a decay of this steady component during the circulation action. Especially if the pulse repetition rates involved are comparatively slow, this decay may be sufficient to cause a multiplied pulse occurring toward the end of the group which should be slightly in excess of half the full signal amplitude range to be, instead, slightly below this level and hence, while it should operate the slicer 16, it fails to do so. To reduce these effects to a minimum places stringent requirements on the design of the feedback loop 1 and its components, especially the amplifier 3. Furthermore, whatever the perfection of their construction, there can always be found a low frequency cut-off below which the components fail to operate reliably.

Figure 3:
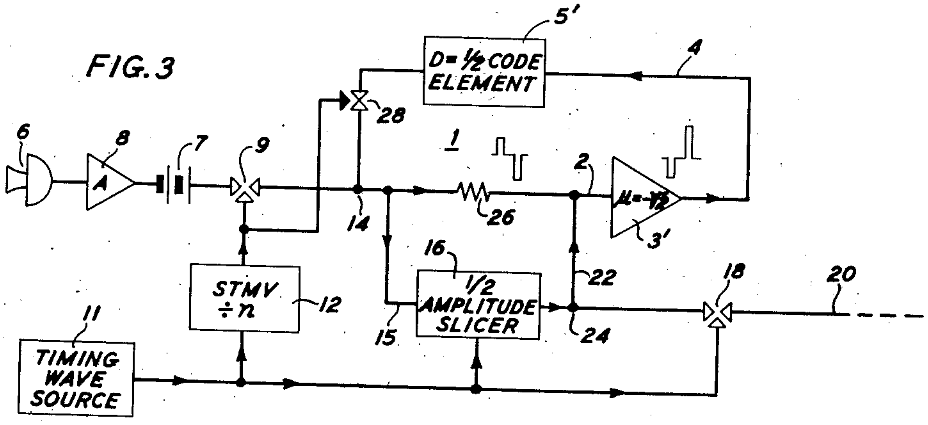
Fig. 3 is a block schematic diagram showing apparatus embodying the invention.

In accordance with the present invention illustrated in Fig. 3, the reliability of operation is increased, and the stringency of the design specifications are diminished, by a reduction in the magnitude of the steady component of each pulse sequence as it circulates around the feedback loop. This is done by the insertion, between each two adjacent pulses of Fig. 2, of a balancing pulse which is of opposite polarity and of a magnitude closely equal to the average of the amplitudes of its neighbors. To avoid the introduction of complexities in the coding operation proper, that operation is carried out as before on the basis of the unipolarity pulses alone, the interleaved pulses of opposite polarity being employed only for balancing purposes. This is accomplished, in accordance with the invention, by so constructing the amplifier 3' that it inverts the polarity of each signal applied to it; i. e., when a positive pulse is applied its output is a negative pulse and when a negative pulse is applied its output is a positive pulse. To secure this result without in any way modifying the coding operation proper it is arranged that each applied pulse shall make two full trips around the feedback loop for each code element or pulse interval, in the course of which it is magnified by a factor 2 as before. On the first of these round trips it is magnified by a factor $\sqrt{2}$, delayed by one-half interpulse interval and inverted in polarity. On the second round trip it is again magnified by a factor $\sqrt{2}$, again delayed by one-half interpulse interval and again inverted in polarity; i. e., restored to its original polarity. The slicer 16 may readily be so constructed that it is unidirectionally responsive; i. e., it responds to positive pulses in excess of one-half of the full amplitude range as before, but does not respond to any negative pulse whatever its amplitude may be. Thus in the construction of the apparatus it is only necessary so to proportion the delay device 5' in the feedback path 4 that it introduces a delay of one-half interpulse interval for each round trip and so to proportion the amplifier as to introduce a gain of $\sqrt{2}$ and a phase inversion for each round trip. Application of signal amplitude samples to be coded having the same magnitudes as those of Fig. 2 now produces the pulse trains shown in Fig. 4. In these figures the positive pulses are identical with the positive pulses of Fig. 2, and they are similarly interpreted by the slicer 16. Between each positive pulse and the following one there appears a negative pulse whose magnitude is the geometrical mean of the magnitudes of its neighbors; i. e., its magnitude is $\sqrt{2}$ times that of its predecessor and $$\frac{1}{\sqrt{2}}$$

times that of the pulse which follows it.

Figure 5:
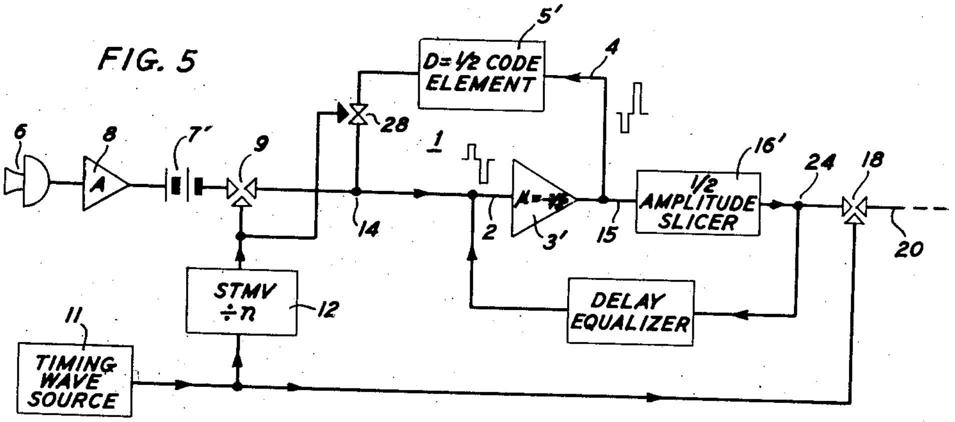
Fig. 5 is a block schematic diagram showing a modification of the apparatus of Fig. 3.

It will now be evident that the locations of the input and output conductors 15, 24 of the slicer 16 with respect to the feedback loop 1 as shown in Figs. 1 and 3 are dictated by convenience rather than necessity. The output of the slicer 16 may in principle be applied at any part of the feedback loop 1 to subtract from the magnitude of the circulating pulse existing at that point. Similarly, the input to the slicer 16 may be derived, as shown in Figs. 1 and 3 from the input terminal 14 of the feedback loop 1 or, if preferred, it may be derived from the output terminal of the amplifier 3 or 3'. Fig. 5 illustrates a system in which a slicer 16' is connected to respond to the output of the amplifier 3'. It thus receives pulses which are increased in magnitude by $\sqrt{2}$ and inverted in polarity as compared with the pulses applied to the slicer 16 of Figs. 1 and 3. With the modification that each input signal sample is reduced in amplitude by a factor $\sqrt{2}$ as compared with its magnitude as discussed above, and with the further modification that each input signal sample is of negative polarity, as provided by the addition to it of the negative potential of a battery 7' or other source, the waveform diagrams of Fig. 4, developed to illustrate the operation of Fig. 3, are applicable to the apparatus of Fig. 5 without change. An auxiliary delay device 29 is included in the auxiliary feedback path which extends from the output point 24 of the slicer 16' and the input point of the amplifier 3' to bring the subtraction pulse into time coincidence with the proper circulating pulse.

Figure 6:
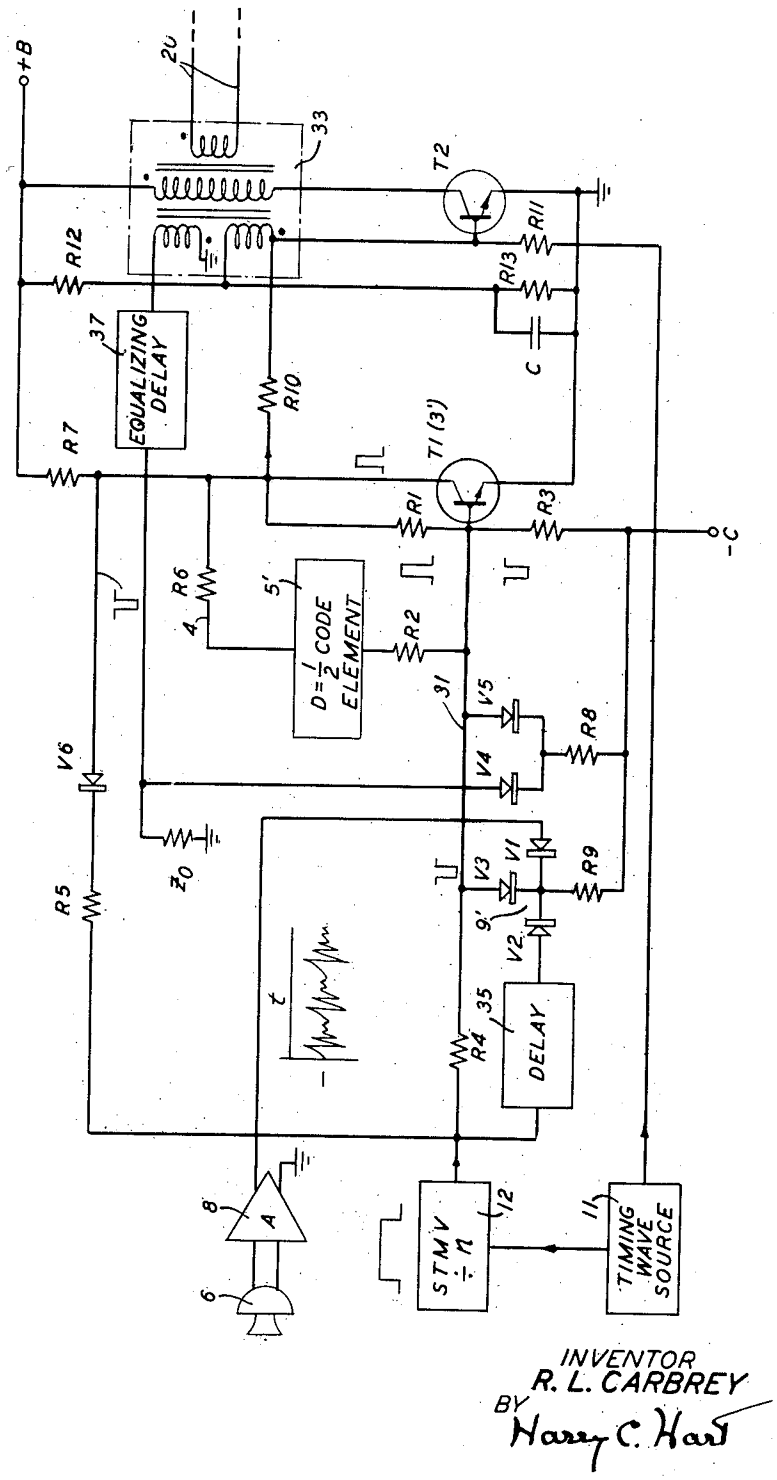
Fig. 6 is a schematic circuit diagram showing details of the apparatus of Fig. 5.

Fig. 6 shows the circuit details of the apparatus of Fig. 5. Speech from the microphone 6 is passed through the amplifier 8 to one terminal of a triple diode gate 9' which, as explained in Meacham Patent 2,576,026, November 20, 1951, may comprise three varistors $V_1$, $V_2$ and $V_3$.

Provided the conduction path is established through $V_1$ and $V_3$, the speech signal passes through this gate and thence by way of a conductor 31 to the base electrode of a transistor $T_1$, which serves as the amplifier 3' of Fig. 3. This amplifier is precisely adjusted, in a fashion to be described, to provide a gain of $\sqrt{2}$. By virtue of its connection in the grounded emitter configuration it produces on its collector connection as its output electrode a pulse which is inverted in polarity with respect to the input pulse applied to its base electrode.

This transistor $T_1$ is normally biased below cut-off by connection of its base electrode to an appropriate point of a voltage divider comprising resistors $R_7$, $R_1$ and $R_3$ connected in series between a positive potential source $B^+$ and a corresponding negative source $C^-$. The delayed feedback path comprises the delay device 5' in series with resistors $R_6$ and $R_2$ and extends from the collector electrode of this transistor $T_1$ to its base electrode. A second feedback path, extending from the collector electrode to the base electrode, comprises merely a resistor $R_1$. This feedback path is degenerative and is included to stabilize the transistor amplifier and to permit precise adjustment of its gain.

A second transistor $T_2$, to whose collector electrode one winding of a transformer 33 is connected serves as the half amplitude slicer of Fig. 5. A second winding of this transformer, coupled to the first, is connected between the base electrode of the transistor $T_2$ and through a resistor $R_{12}$ to the source $B^+$. These connections make for blocking oscillator operation. This transistor $T_2$ is biased to trip only for pulses of one-half the full signal range or greater by adjustment of the magnitudes of two resistors $R_{12}$ and $R_{13}$, connected in series between the source $B^+$ and ground, the base electrode of the transistor being connected to their common point through one winding of the transformer 33.

A timing wave source 11 tuned to deliver pulses at the desired code pulse repetition rate controls a single trip multivibrator 12 which is adjusted to deliver an output pulse for each outgoing pulse group and hence for each incoming signal sample. The output of this single trip multivibrator is applied by way of a resistor $R_4$ and the conductor 31 to the base electrode of the transistor $T_1$, thus to bring it out of its cut-off condition and into its operating condition. The output of the single trip multivibrator 12 is simultaneously applied to the anode of the varistor $V_3$ of the triple diode gate 9', thus to establish a conduction path through this gate for the signal from the microphone 6. Shortly thereafter the path through this gate is disestablished by application of the positive output of the same single trip multivibrator 12 through an auxiliary delay device 35 to the anode of the varistor $V_2$. Thus the conduction path through the triple diode gate 9' is established only during a brief interval determined by the delay introduced by the auxiliary delay device 35.

During this brief interval a sample of the incoming signal from the microphone 6 is applied by way of the conductor 31 to the base electrode of the transistor $T_1$. As above stated in the discussion of Fig. 5, this signal is negative in polarity. This pulse is amplified by a factor $\sqrt{2}$, inverted in polarity by the transistor $T_1$, and applied by way of the feedback path 4 to reappear at the base electrode of the transistor as a positive pulse, magnified by a factor $\sqrt{2}$ and delayed by one-half interpulse interval. After the next trip around this feedback loop it is reinverted in polarity, again magnified by $\sqrt{2}$ and again delayed by one-half interpulse interval, to reappear at the base electrode $T_1$ as a negative pulse of magnitude twice that of the original sample and one full period later. As explained in connection with Figs. 3 and 5 each pulse makes two trips around the main feedback loop of Fig. 6 for each element of the outgoing code pulse group.

When in the course of this process the pulse output of the transistor $T_1$ reaches an amplitude equal to or greater than one-half the full signal amplitude range it is applied, by way of a resistor $R_{10}$ to the base electrode of the transistor $T_2$ and by way of the coupling between the second winding and the first winding of the transformer 33, to its collector electrode, thereby to cause the blocking oscillator to fire. This, however, takes place only when the pulse output of the transistor $T_1$ is positive. The direction in which the coils of the transformer are wound ensure that a negative pulse output of the transistor $T_1$ shall only drive the transistor $T_2$ still further below cutoff.

When the transistor fires, the blocking oscillator of which it is the active element executes one full oscillation swing, delivering a code pulse through the third winding of the transformer 33 to the outgoing line 20 and, at the same time, delivering a negative pulse through a fourth winding of the transformer 33 and through an equalizing delay device 37 and a load resistor $Z_0$ to ground. The resulting drop across the load resistor $Z_0$ is applied to the anode of a varistor $V_4$ which is normally conductive. The cathode of this varistor $V_4$ is connected to the cathode of another varistor $V_5$ and to one terminal of a resistor $R_8$ whose other terminal is connected to the negative source $C^-$. This negative pulse is of amplitude sufficient to drive the varistor $V_4$ into its nonconducting condition for the brief interval during which the pulse endures. This virtually establishes an open circuit through the varistor $V_4$ between ground and the potential source $C^-$. Thereupon the voltage drop which theretofore existed across the resistor $R_8$, due to the current flowing in series through this resistor and the terminating resistor $Z_0$ from ground to the potential source $C^-$, is reduced and the potential of the cathodes of the varistors $V_4$ and $V_5$ falls. This brings the varistor $V_5$ into its conducting condition, and the fallen potential across the resistor $R_8$ is applied by way of the conductor 31 to the base electrode of the transistor $T_1$ as a negative pulse, enduring only for the duration of the actuating pulse applied to the varistor $V_4$ and of a magnitude which may be precisely adjusted to one-half the full signal amplitude range by appropriate proportioning of the magnitude of the resistor $R_8$ in relation to the potential of the source $C^-$.

To ensure that the outgoing pulses shall not overlap but occupy their proper time intervals, i. e., that each of them shall occupy about one-half of the time allotted to a single code element, the transistor $T_2$ which serves as the slicer may be gated for a brief interval during each code element. To this end, a sequence of pulses recurring at the code element rate are applied from the timing wave source 11 and by way of a resistor $R_{11}$ to the base electrode of the transistor $T_2$.

Uncontrolled regeneration by circulation of unwanted pulses around the coding feedback loop is prevented by disabling the loop, e. g., by driving the transistor amplifier $T_1$ below cutoff, at the conclusion of each outgoing pulse group. This is effected by application of the trailing edge of the pulse output of the single trip multivibrator 12 through a resistor $R_4$ over the conductor 31 to the transistor base electrode. Simultaneous application of the trailing edge of the same pulse to the collector electrode of the transistor $T_1$ by way of a resistor $R_5$ and a varistor $V_6$ prevents a consequent increase of potential at the collector which would otherwise occur as a result of cutting off the current flow in transistor $T_1$. Holding the collector potential at its nominal operating midpoint during the time the transistor is cut off prevents normal negative feedback by way of resistor $R_1$ from cancelling a part of the cutoff control pulse. It also prevents undesirable transients from starting in the loop at the instant the transistor $T_1$ is turned back on.

The manner in which the amplifier gain is adjusted to the required value will be understood from the following considerations:

Assume that at a particular moment a voltage $e_d$ appears at the output terminal of the delay device 5' in the feedback path 4. This voltage corresponds to a current, flowing in the resistor $R_2$, of magnitude $$i_b=\frac{e_d}{R_2}$$

Because the input impedance of the transistor $T_1$ is low compared with the resistances of resistors $R_1$ and $R_3$, substantially this entire current flows into the base electrode of the transistor $T_1$. This in turn causes a current $$i_c=\frac{\alpha}{1-\alpha}\frac{e_d}{R_2}$$

to flow in the collector circuit of the transistor $T_1$.

With a transistor in which the current multiplication factor $\alpha$ is very close to unity, this collector current is very large, and hence develops a large negative-going voltage $-e_c$ across the load resistor $R_7$. The gain through this action is much greater than the required value $\sqrt{2}$. However, as this large inverted voltage starts to develop in the collector circuit of the transistor $T_1$, the voltage across the resistor $R_1$ drops, and the drop is accompanied by a current $$i_b'=-\frac{e_c}{R_1}$$

which is introduced, along with the current $i_b$, into the base electrode of the transistor $T_1$ and tends to cancel it. With a value of unity for $\alpha$ the cancellation is, ideally, perfect, and a substantial collector current results from an infinitesimal base current. In this ideal case, the two components of the base current being alike in magnitude, $$i_b=-i_b'=\frac{e_d}{R_2}=\frac{e_c}{R_1}$$

and therefore $$\frac{e_c}{e_d}=\frac{R_1}{R_2}$$

Hence, to secure a gain factor of $\sqrt{2}$, it is only necessary so to proportion the resistors $R_1$ and $R_2$ that their ratio is equal to 1.414. . . .

The current multiplication factors of transistors which are presently available are sufficiently close to unity to permit securing the required gain, to a close approximation, with resistors having these magnitudes. Final exact adjustment can readily be made by minor empirical trimming of the magnitudes of the resistors.

The essential elements and adjustments of the coding apparatus of Fig. 1 are similar to the essential elements and adjustments of the decoding apparatus of Carbrey Patent 2,579,302, while the essential elements and adjustments of the coding apparatus of Figs. 3, 5 and 6 are similar to the corresponding elements and adjustments of the decoding apparatus of an application of R. L. Carbrey, Serial No. 574,521, filed March 28, 1956, to which reference is made. It will readily be apparent to the reader how these essential elements of a single circuit may be employed for coding and for decoding alternatively, by the combination therewith of the slicer of the present application for coding and of the evaluator of the Carbrey patent and copending application for decoding.

What is claimed is:

1. In a system for converting an amplitude sample of a signal wave of limited full amplitude range into a code group of two-valued pulses occurring at equal time intervals, each pulse of one value representing a portion of said amplitude range, a feedback loop including an amplifier and a delay device, a connection for introducing said sample into said loop, whereupon it circulates around said loop, said amplifier and delay device being proportioned to magnify said sample by a factor 2 and to delay it by a single interpulse interval in the course of an even number of loop round trips occupying said interval, and a slicer coupled to said network and responsive to a loop-circulating pulse in excess of one-half said full amplitude range for (*a*) delivering an output "on" pulse, and (*b*) subtracting said half amplitude from said circulating pulse to provide a residue for circulation around said loop.

2. Apparatus as defined in claim 1 wherein said amplifier is proportioned to introduce a gain of $\sqrt{2}$ and said delay device is proportioned to introduce a delay of one-half interpulse interval for each circulation of a pulse around said loop.

3. Apparatus as defined in claim 1 wherein said delay device is proportioned to cause each sample applied to said loop to make two full round trips around said loop during a single interpulse interval.

4. Apparatus as defined in claim 1 wherein said amplifier is proportioned to introduce a gain of $$(2)^{\frac{1}{2r}}$$

for each loop round trip and said delay device is proportioned to introduce a delay of $T/2r$ for each loop round trip, where $r$ is an integer and T is the length of a single interpulse interval.

5. Apparatus as defined in claim 4 wherein said amplifier is proportioned to invert the phase of each signal applied to it.

6. Apparatus as defined in claim 1 wherein said amplifier comprises a transistor connected in the grounded-emitter configuration.

7. In combination with apparatus as defined in claim 1, a timing wave source, and means controlled by said timing wave source for disabling said feedback loop at the conclusion of a code pulse group.

8. In combination with apparatus as defined in claim 1, an outgoing line, a timing wave source, and means controlled by said timing wave source for applying the output of said slicer to said outgoing line once for each element of each code pulse group.

9. In a system for converting an amplitude sample of a signal wave of limited full amplitude range into a code group of two-valued pulses occurring at equal time intervals, each pulse of one value representing a portion of said amplitude range, a feedback loop including a phase-inverting amplifier having a gain of $\sqrt{2}$, a delay device for delaying a pulse applied to it by one-half interpulse interval, a connection for introducing said sample into said loop, whereupon it circulates around said loop, and a slicer coupled to said network and responsive to a loop-circulating pulse in excess of one-half said full amplitude range for (*a*) delivering an output "on" pulse, and (*b*) subtracting said half amplitude from said circulating pulse to provide a residue for circulation around said loop.

10. In a system for converting an amplitude sample of a signal wave of limited full amplitude range into a code group of two-valued pulses occurring at equal time intervals, each pulse of one value representing a portion of said amplitude range, a phase inverting amplifier of substantial gain, having an input terminal and an output terminal, a first reactance-free feedback path extending from said output terminal to said input terminal for stabilizing the operation of said amplifier, said first path containing a first resistor for modifying the effective gain of said amplifier, a second feedback path extending from said ouput terminal to said input terminal and including a one-half interpulse interval delay device and a second resistor, said first and second resistors being so proportioned that the ratio of their resistances has the value $\sqrt{2}$, means for applying a pulse to said amplifier in response to each amplitude sample to be translated, whereupon said pulse circulates around the feedback loop comprising said amplifier and said second feedback path, making two round trips for each interpulse interval and a slicer coupled to said feedback loop and responsive to a loop-circulating pulse in excess of one-half said full amplitude range for (*a*) delivering an output "on" pulse, and (*b*) subtracting said half amplitude from said circulating pulse to provide a residue for circulation around said loop.

References Cited in the file of this patent

UNITED STATES PATENTS 2,569,927 Gloess et al. ------------- Oct. 2, 1951